(12) United States Patent
Brandt et al.

(10) Patent No.: US 6,494,625 B1
(45) Date of Patent: Dec. 17, 2002

(54) COLOR-CODED RESTORATION SPLICE BLOCK

(75) Inventors: John D. Brandt, Oldenburg, IN (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 15 days.

(21) Appl. No.: 09/811,864

(22) Filed: Mar. 19, 2001

(51) Int. Cl.[7] .............................................. G02B 6/255
(52) U.S. Cl. ........................ 385/95; 385/114; 385/135; 385/137
(58) Field of Search ............................ 385/95–99, 135, 385/137, 114, 134, 136

(56) References Cited

U.S. PATENT DOCUMENTS

| 4,702,551 A | 10/1987 | Coulombe |
| 5,530,786 A | 6/1996 | Radcliff et al. |
| 5,825,963 A | 10/1998 | Burgett |
| 6,094,518 A | 7/2000 | Eslambolchi et al. |
| 6,217,233 B1 * | 4/2001 | Eslambolchi et al. .......... 385/95 |

\* cited by examiner

Primary Examiner—Phan T. H. Palmer

(57) ABSTRACT

A color-coded restoration splice block is formed to match the coloring of the individual fibers within a standard ribbon cable. Thus, during the splicing operation, the proper pairs of fibers will be mated and laid within the same fiber-holding groove, eliminating the problem of "crossing" fibers from one ribbon to another as they are spliced together. In a preferred embodiment, the entire groove is colored to match the sheath color of the pair of fibers disposed in the groove.

8 Claims, 1 Drawing Sheet

COLOR-CODED RESTORATION SPLICE BLOCK

TECHNICAL FIELD

The present invention relates to a quick restoration splice block for use in splicing fiber optic ribbon cables and, more particularly, to a color-coded splice block to ensure that the proper fibers within each cable are mated to each other.

BACKGROUND OF THE INVENTION

Quick restoration of optical signal paths is essential when failures occur in an optical fiber network. The failures ranges from cable breaks due to contractor "dig ups" to environmental damage (such as lightning strikes and cable burn). To repair these types of failures, a communication field technician must find and isolate the damaged section of fiber cable, dig up the cable, and splice the fibers back together. Restoration splicing consists of using a quick, temporary splice that will optically couple the fibers back together.

Most conventional fiber optical cables consist of one or more ribbons, where a single ribbon comprises twelve separate fibers that are bonded transversally to form a single structure, each ribbon thus treated as a single unit within the cable, with a unitary sheathing structure formed to surround the ribbon. In order to mechanically splice a pair of ribbons back together, the sheathing must be removed and the ends of the fibers cleaved and cleaned (to form the best possible endface surface for fusion splicing of the mating fibers). A standard ribbon cable is manufactured in accordance with a standard color code (i.e., fiber No. 1 is "blue", fiber No. 2 is "orange" . . . , and fiber No. 12 is "aqua"; each intermediate fiber is also associated with a readily-definable color). This color code will be repeated for each ribbon within the cable. For example, a cable housing 216 fibers will be formed as 18 individual ribbons, with the same color code used in each ribbon. When splicing a pair of ribbons together, it is important that the color code be followed (e.g., the "blue" fibers spliced together, the "orange" fibers spliced together, etc.). In a conventional arrangement, the blue fibers are inserted in the top opening of the splice housing and the aqua fibers are inserted in the bottom opening.

If one fiber ribbon is improperly placed in the splice housing (i.e., "upside down"), with the aqua fiber on the top and the blue fiber on the bottom, the signal lines will be "crossed" and communication will not be restored. However, since light will still be coupled from one ribbon to another, the splice would appear to be working properly and the repair technician may not be able to discover the mistake. It would, therefore, be desirable and advantageous to provide a splice element that would eliminate the possibility of "crossing" the fibers in a ribbon cable splice.

SUMMARY OF THE INVENTION

The need remaining in the prior art is addressed by the present invention, which relates to a quick restoration splice block for use in splicing a fiber optic ribbon cable and, more particularly, to a color-coded splice block to ensure that the proper fibers within each cable are mated to the fibers in the other cable.

In a preferred embodiment of the present invention, there is provided a splice block whose fiber-holding grooves are colored to follow the conventional color-coding scheme in a ribbon cable. That is, the "top" groove in a splice block is coated with a blue layer, the next groove is orange, and so on, with the "bottom" groove being colored aqua. In this manner, the repair technician needs only to follow the coloring scheme in the splice block to ensure that like fibers within a pair of ribbon cables are spliced together.

In an alternative arrangement, the coloring may be disposed at the entrance of each groove along the splice block, instead of coloring a portion of each groove. In any embodiment, however, each fiber-holding groove is associated with one (and only one) of the specific fiber colors of the ribbon and the risk of "crossing" fibers in the splice block is essentially eliminated.

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
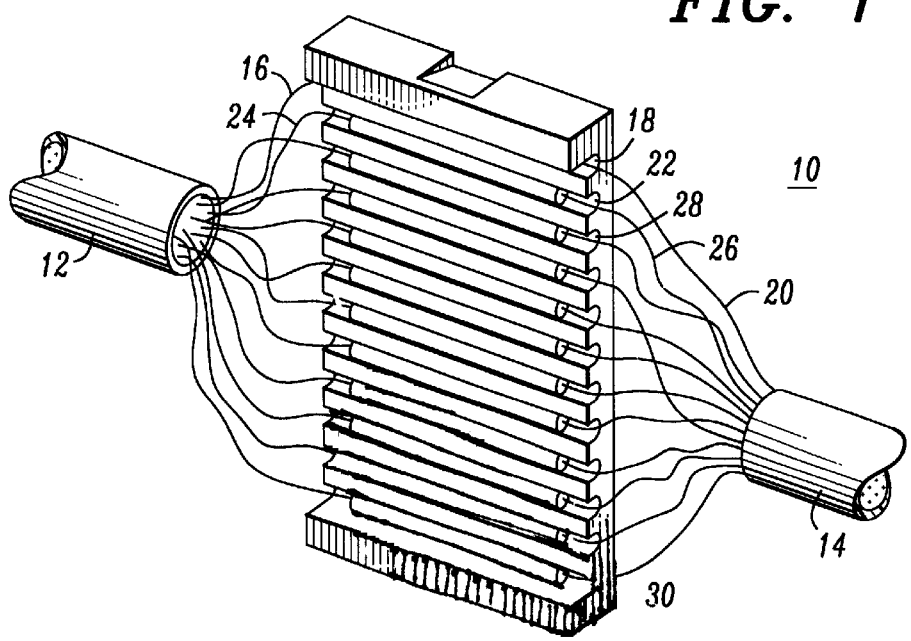
FIG. 1 illustrates an exemplary splice block utilizing the color-coding scheme of the present invention along the fiber-holding grooves of the splice block.

FIG. 1 illustrates an exemplary color-coded splice block 10 formed in accordance with the present invention. As shown, splice block 10 is used to match the individual optical fibers from a first ribbon cable 12 with the individual optical fibers from a second ribbon cable 14. In the exemplary arrangement of splice block 10, each pair of fibers to be mated will lay in a groove in block 10, then be coupled together using a fusion splice.

As discussed above, the individual fibers within an exemplary ribbon cable are color-coded. In an exemplary embodiment a twelve-fiber ribbon cable following conventional industry standard is used:

| Fiber Number | Color |
| --- | --- |
| 1 | Blue |
| 2 | Orange |
| 3 | Green |
| 4 | Brown |
| 5 | Slate |
| 6 | White |
| 7 | Red |
| 8 | Black |
| 9 | Yellow |
| 10 | Violet |
| 11 | Rose |
| 12 | aqua |

In accordance with the present invention, the potential problem of inverting a ribbon as the fibers are spliced together is eliminated by coloring each associated groove in splice block 10 to have the same color as the pair of fibers being joined within that groove. Referring to FIG. 1 in particular, fiber 16 of first ribbon cable 12 is the "first" fiber in ribbon 12 and is color-coded blue. Therefore, first groove 18 within splice block 10 is colored to have the same blue hue as first fiber 16. Thus, second ribbon cable 14 will also be properly aligned, so that a first (blue-coated) fiber 20 of second ribbon cable 14 will be disposed in first groove 18 so as to mate with fiber 16 of first ribbon cable 12. In a similar manner, second groove 22 of splice block 10 is colored orange, to be associated with the second fibers from each cable (denoted 24 and 26, respectively), third groove 28 is colored green, and so on, with the twelfth groove 30 colored aqua.

Figure 2:
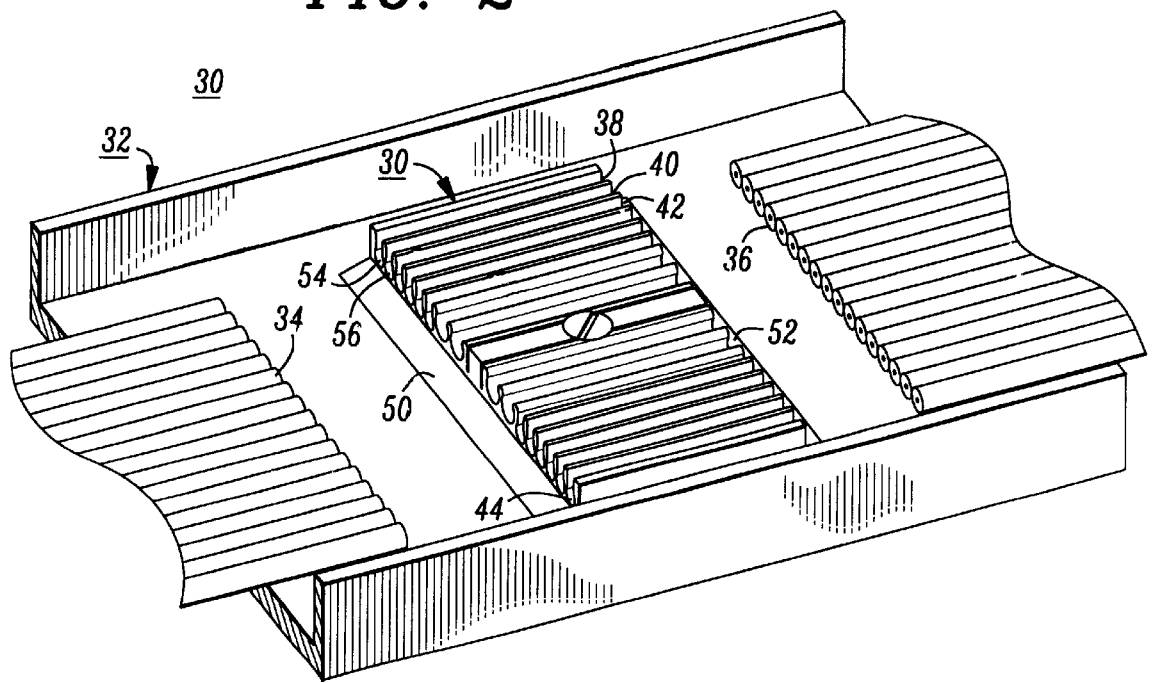
FIG. 2 illustrates an alternative embodiment of the present invention, including the color-coding on the floor of the splice block at the entrance and exit of each groove.

An alternative embodiment of the present invention is illustrated in FIG. 2, which comprises a splice block 30 attached to a support member 32. In this arrangement, a first ribbon cable 34 is disposed across the left-hand portion of support member 32 and a second ribbon cable 36 is disposed across the right-hand portion of support member 32. In accordance with the present invention, the individual grooves within splice block 30 may be color-coded to match with the fibers forming the ribbon. In this example, therefore, a first groove 38 would be blue, a second groove 40 would be orange, a third groove 42 would be green, and so on, with the twelfth groove 44 being colored aqua. As an alternative, a pair of color strips 50 and 52 may be attached to support member 32 at the entrance and exit, respectively, of splice block 30. In accordance with the present invention, color strip 50 comprises separate color sections, each disposed in front of a separate groove to aid in inserting the proper color fiber in each groove. For example, first block 54 of strip 50 would be blue, second block 56 would be orange, and so on. Strip 52 would also comprise like blocks of color and be similarly laid out so that the proper fibers from second ribbon cable 36 would be inserted in the intended grooves.

It is to be understood that there are various modifications that may be made to the above-described embodiments and all are considered to fall within the spirit and scope of the present invention. For example, the splice block is illustrated as being used with a twelve-fiber ribbon. If and when other numbers of fibers are formed as a collection and color-coded, the splice block of the present invention may be modified accordingly, in terms of the particular colors, color sequence, and/or number of fibers. Indeed, the subject matter of the present invention is intended to be limited only by the scope of the claims appended hereto.

What is claimed is:

1. A restoration splice block for splicing together, in each optical fiber within a first, color-coded fiber ribbon cable to a corresponding fiber within a second, color-coded fiber ribbon cable, wherein the first and second ribbon cables utilize the same color coding scheme, the restoration splice block comprising:

a plurality of grooves, each groove defined by first and second opposing ends, for supporting one fiber from the first ribbon cable inserted at the first end, and one fiber from the second ribbon cable inserted at the second end, so as to allow for splicing of the fibers from the first and second cables; and a color-coding arrangement associated with the plurality of grooves such that each groove is associated with a separate color within the color coding scheme of the first and second ribbon cables.

2. A restoration splice block as defined in claim 1 wherein the color-coding arrangement comprises a colored area along at least the opposing end portions of each groove.

3. A restoration splice block as defined in claim 2 wherein each groove is colored along its entire length to exhibit its associated color of the ribbon cable color coding scheme.

4. A restoration splice block as defined in claim 1 wherein the color-coding arrangement comprises a pair of color-coded strips, each disposed at an opposing end of the plurality of grooves.

5. A restoration splice block as defined in claim 1 for use with a pair of twelve ribbon fiber cables using the following color coding scheme: fiber 1—blue, fiber 2—orange, fiber 3—green, fiber 4—brown, fiber 5—slate, fiber 6—white, fiber 7—red, fiber 8—black, fiber 9—yellow, fiber 10—violet, fiber 11—rose, and fiber 12—aqua.

6. A method of splicing individual fibers within a first color-coded ribbon cable of N fibers to associated fibers within a second color-coded ribbon cable of N fibers, the method comprising the steps of:

a) providing a splice block comprising a plurality of N grooves, each groove for supporting separate pairs of optical fibers from the first and second ribbon cables; and b) color-coding the plurality of grooves to match the color coding scheme of the first and second ribbon cables and to aid in proper splicing of correct pairs of fibers.

7. The method of claim 6 wherein in performing step b), at least a portion of each groove is colored to match the color-coding of the associated pair of fibers.

8. The method of claim 6 wherein in performing step b), a color-coded element is disposed at each end termination of the splice block.

* * * * *